United States Patent
Ihida et al.

(10) Patent No.: US 7,075,603 B2
(45) Date of Patent: Jul. 11, 2006

(54) METHOD OF FABRICATING A SEMI-TRANSMISSION LCD BY PLASMA PROCESSING AND WASHING ORGANIC FILM, AND LCD FABRICATED THEREBY

(75) Inventors: Satoshi Ihida, Tokyo (JP); Masaki Shinohara, Tokyo (JP); Manabu Oyama, Akita (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 214 days.

(21) Appl. No.: 10/282,179

(22) Filed: Oct. 29, 2002

(65) Prior Publication Data

US 2003/0081160 A1 May 1, 2003

(30) Foreign Application Priority Data

Oct. 30, 2001 (JP) ............... 2001-332902

(51) Int. Cl.
  *G02F 1/1333* (2006.01)
  *G02F 1/1343* (2006.01)
(52) U.S. Cl. ............. 349/114; 349/113; 349/122; 349/138; 349/187
(58) Field of Classification Search ......... 349/114, 349/122, 138
  See application file for complete search history.

(56) References Cited

U.S. PATENT DOCUMENTS 5,959,312 A * 9/1999 Tsai et al. ............... 257/57
6,195,140 B1 * 2/2001 Kubo et al. ............... 349/44
6,238,754 B1 * 5/2001 Shohara et al. ............ 428/1.5
6,288,765 B1 * 9/2001 Tanaka et al. ............. 349/153
6,344,884 B1 * 2/2002 Kim et al. ................. 349/43
6,417,901 B1 * 7/2002 Okada et al. .............. 349/113
6,512,562 B1 * 1/2003 Kobayashi et al. ........ 349/122
6,630,977 B1 * 10/2003 Yamazaki et al. ......... 349/141
2002/0159011 A1 * 10/2002 Ikeno et al. ............... 349/117
2003/0030768 A1 * 2/2003 Sakamoto et al. ......... 349/113
2003/0053016 A1 * 3/2003 Kubota et al. ............. 349/113

FOREIGN PATENT DOCUMENTS

| JP | 11-281993 | 10/1999 |
| JP | 11-337973 | 12/1999 |
| JP | 2001-75091 | 3/2001 |

* cited by examiner

*Primary Examiner*—Andrew Schechter
(74) *Attorney, Agent, or Firm*—McGinn IP Law Group, PLLC (57) ABSTRACT

In a semi-transmission type liquid crystal display and a method for fabricating the same, a reflective electrode such as aluminum layer and a transparent electrode such as ITO film are used to form a pixel electrode that is provided on an organic film having an uneven surface. In order to effectively restrict the battery effect between a reflective electrode and a transparent electrode, a surface of the organic film is put in a plasma-processing and then is washed by a washing liquid. Thereafter, the transparent electrode is formed and then the reflective electrode such as a double layer electrode of the aluminum layer and the molybdenum layer are formed.

14 Claims, 8 Drawing Sheets

METHOD OF FABRICATING A SEMI-TRANSMISSION LCD BY PLASMA PROCESSING AND WASHING ORGANIC FILM, AND LCD FABRICATED THEREBY

BACKGROUND OF THE INVENTION

1. Field of the Invention

The present invention relates to a liquid crystal display and a fabrication method thereof and, particularly, to a semi-transmission type liquid crystal display and a fabrication method thereof.

2. Description of the Prior Art

Since liquid crystal itself cannot emit light, a backlight is used in a conventional liquid crystal display. That is, a backlight is arranged behind a liquid crystal panel composed of two transparent substrates and a liquid crystal layer sealed therebetween and characters or picture is displayed on a surface of the liquid crystal panel by allowing a portion of light from the backlight to pass through the panel and blocking another portion of the light. The liquid crystal display of this type is generally referred to as the transmission type liquid crystal display.

In such transmission type liquid crystal display, a fluorescent tube or a LED is used as a light source of the backlight, which consumes electric power. In order to solve the problem of power consumption, a reflection type liquid crystal display has been proposed for use in a battery-powered equipment such as portable equipment, which has no backlight and in which external light incident on a surface of the liquid crystal panel is reflected by a reflector.

Such reflection type liquid crystal display is advantageous in reduction of power consumption due to absence of the backlight. However, the reflection type liquid crystal display cannot be used without external light. That is, in a case where ambient light is dark, intensity of light reflected by the reflector is not enough and so visibility is lowered.

In order to complement the defects of the transmission type liquid crystal display and the reflection type liquid crystal display, JP 2001-75091 A proposes a semi-transmission type liquid crystal display in which a portion of external light is reflected and a portion of light from a backlight is allowed to pass through the liquid crystal display. In the proposed technique, a transparent insulating layer having irregular structure is formed as an underlying layer of pixel electrodes, a transparent electrode is formed on a whole surface of the irregular insulating layer and aluminum reflection electrodes are selectively vapor-deposited on the transparent electrode. Particularly, it is proposed in JP 2001-75091 A that the reflection electrodes are vapor-deposited in not flat regions but irregular regions of the irregular transparent electrode, such that the flat regions of the transparent electrode become light transmitting regions.

It should be noted that very high technique is required in selectively vapor-depositing the reflection electrodes. In addition to this difficulty, highly precise positioning technique is required. Therefore, an application of the proposed technique to a mass production is difficult.

Although, instead of the selective vapor-deposition, a method suitable for mass production may be considered, in which a reflection electrode is vapor-deposited on a whole surface of a transparent electrode and then opening portions are selectively formed therein by etching, the highly precise positioning technique is still required even in such case.

A new problem of the etching processing is that, since developer for removing a photo resist in a patterning step acts as electrolytic agent, battery reaction occurs between aluminum forming the reflection electrode and indium tin oxide (ITO) forming the transparent electrode. That is, since defect of an aluminum film such as pin hole, which is left in the aluminum film when the latter is formed on the transparent electrode by vapor-deposition, is unavoidable in the current technology, battery reaction occurs between the aluminum film and the transparent electrode if the developer enters into the pin hole, so that electrolytic corrosion of not only the aluminum film but also the transparent electrode occurs, causing production yield of the liquid crystal display to be lowered.

SUMMARY OF THE INVENTION

An object of the present invention is to provide a semi-transmission type liquid crystal display, which is capable of relaxing the positioning preciseness during a fabrication thereof and has a structure with which restriction of battery reaction can be done easily, and to provide a fabrication method of the same semi-transmission type liquid crystal display.

In a semi-transmission type liquid crystal display according to the present invention, a pixel electrode region is divided into a reflection electrode region and a transparent electrode region. The reflection electrode and the transparent electrode are formed directly on a surface of a quality-improving layer of an irregular insulating film as an underlying layer of these electrodes. An electric connection to TFTs is realized by a material of a reflection electrode, which has resistivity lower than that of a material of the transparent electrode, and the reflection electrode and the transparent electrode in one pixel electrode are maintained at identical potentials by the reflection electrode. In the present invention, a pixel electrode region is divided into the reflection electrode region and the transparent electrode region as mentioned above and the reflection electrode and the transparent electrode are formed such that they are in direct contact with the quality-improving layer of the irregular insulating film, which is washed. Since the reflection electrode and the transparent electrode are in direct contact with the quality-improving layer formed on the irregular insulating film, intimate contact can be obtained between the irregular insulating member and the reflection and transparent electrodes. Particularly, by washing the surface of the quality-improving layer immediately before the transparent electrode and the reflection electrode are formed, crystallinity of the transparent electrode and the reflection electrode formed thereon is improved, so that yield of good product is improved.

DETAILED DESCRIPTION OF THE PREFERRED EMBODIMENTS

Figure 1:
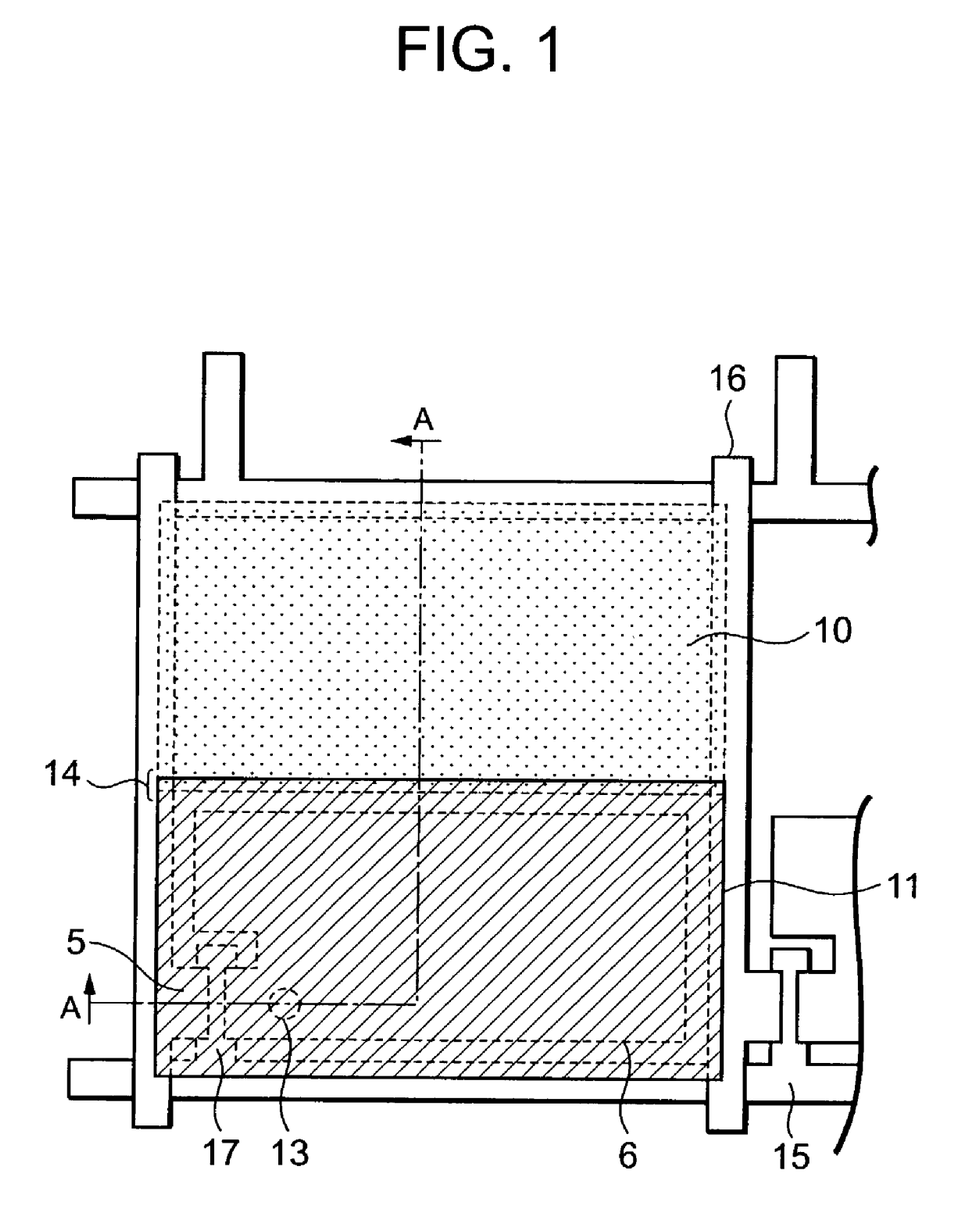
FIG. 1 is a plan view of a TFT substrate of a liquid crystal display according to the present invention.

As shown in FIG. 1, each pixel electrode of a semi-transmission type liquid crystal display according to an embodiment of the present invention is divided into a transparent electrode region and a reflection electrode region. Each pixel electrode region is defined by adjacent two scan lines 15 and adjacent two data lines 16. In a region for one pixel, a thin film transistor (TFT) 17 is arranged and a reflection electrode 11 is connected to a current electrode (for example, drain electrode 6) through a contact hole 13. Reference numeral 14 shows an overlapped portion of a transparent electrode 10 and the reflection electrode 11. In FIG. 1, the overlapped portion 14 extends in a direction parallel to an extending direction of the scan line 15. The transparent electrode 10 and the reflection electrode 11 are maintained at identical potentials by this overlapped portion 14.

Figure 2:
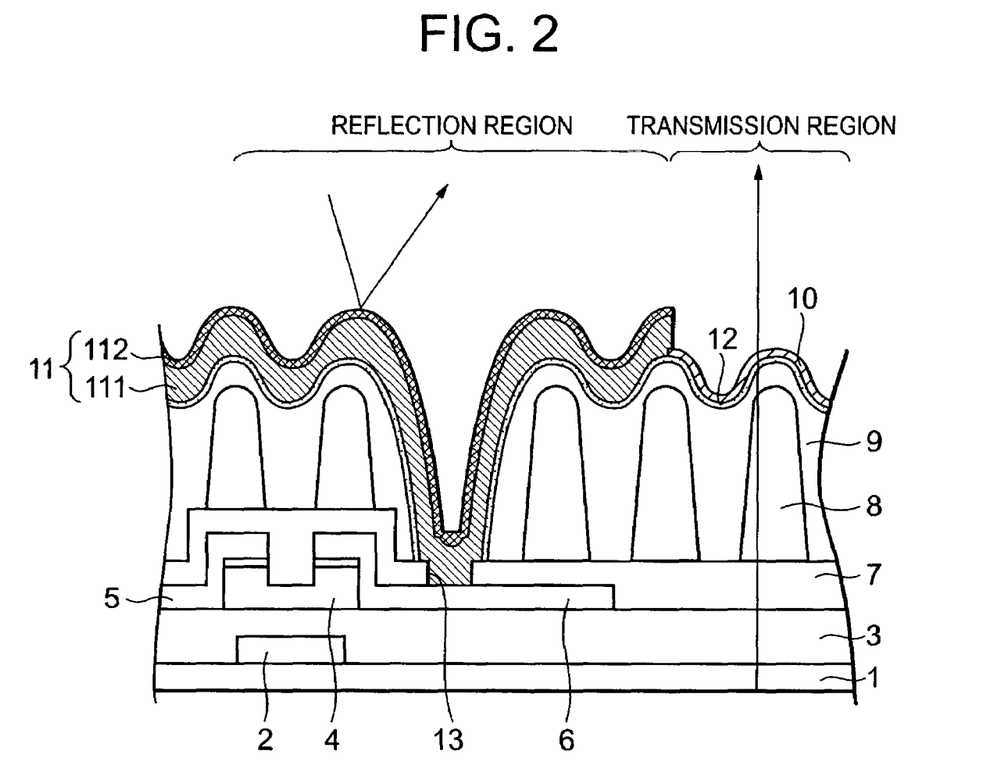
FIG. 2 is a cross section taken along a line A—A in FIG. 1.

A construction of the pixel electrode will be described in detail with reference to FIG. 2 showing a cross section taken along a line A—A in FIG. 1. A gate electrode 2, a gate insulating film 3, a semiconductor layer 4, a source electrode 5, a drain electrode 6 and a passivation film 7 are formed on a transparent substrate 1. A transparent underlying layer for forming irregularity on the pixel electrode is formed on these elements. The underlying layer includes a first transparent organic film 8 and a second transparent organic film 9, materials of which are usable to form a resist. A quality-improving layer 12 is formed on a surface of the second organic film 9 by plasma-processing the second organic film 9. The transparent electrode 10 and the reflection electrode 11 are formed on the quality-improving layer 12. The reflection electrode 11 has a double layer structure for a reason to be described later.

In this embodiment, the transparent electrode 10 is formed of indium tin oxide (ITO) and the opaque reflection electrode 11 is a lamination of a molybdenum (Mo) film 111 and an aluminum (Al) film 12.

Since the transparent region and the opaque region of the pixel electrode region are provided by dividing the whole pixel electrode by two without making them correspondent to respective irregular regions thereof, there is provided a preciseness margin in a lithography step for forming the transparent electrode and the reflection electrode. Therefore, it is possible to fabricate a TFT substrate of the semi-transmission type liquid crystal display without requiring highly precise positioning step.

The reason for forming the surface quality-improving layer 12 on the organic film 9 by plasma-processing the latter is to improve the adhesion between the pixel electrode and the irregular insulating member. Incidentally, a technique for improving the adhesion between the transparent organic film and the ITO film in forming the latter on the transparent organic film as the transparent pixel electrode is disclosed in JP H11-337973 A. However, the disclosed technique is applied to a transmission type liquid crystal display and there is neither description of an organic film having irregular surface condition nor description of application to the reflection type or semi-transmission type liquid crystal display in JP H11-337973 A.

Furthermore, the reason for that the reflection pixel electrode includes the aluminum film and the molybdenum film is to avoid corrosion of the ITO film by battery effect between the aluminum film and the ITO film in developing the resist for patterning the aluminum film in a resist forming step since, by partitioning between the aluminum film and the ITO film by means of the molybdenum film, the battery effect therebetween can be restricted. Moreover, there is a merit that the lamination of the aluminum film and the ITO film can be etched by using one etching liquid, which is a mixture of nitric acid, acetic acid, phosphoric acid and water. Such technique is disclosed in JP H11-281993 A. In the latter, there is no description of the formations of the ITO pixel electrode and the reflection pixel electrode though there is a description of the formation of the ITO electrode terminal portion. Therefore, it is believed that an application of the technique disclosed in JP H11-281993 A to the present invention is impossible without the knowledge of the present invention.

In this embodiment, the pixel electrode in the pixel region defined by the scan lines 15 and the data lines 16 is divided into the transparent electrode region and the reflection electrode region by a line extending in parallel to the extending direction of the scan line and the transparent electrode region and the reflection electrode region are formed on the organic film having the surface quality improving layer washed with the washing liquid.

Now, a fabrication method for fabricating the semi-transmission type liquid crystal display according to this embodiment will be described.

Figure 3:
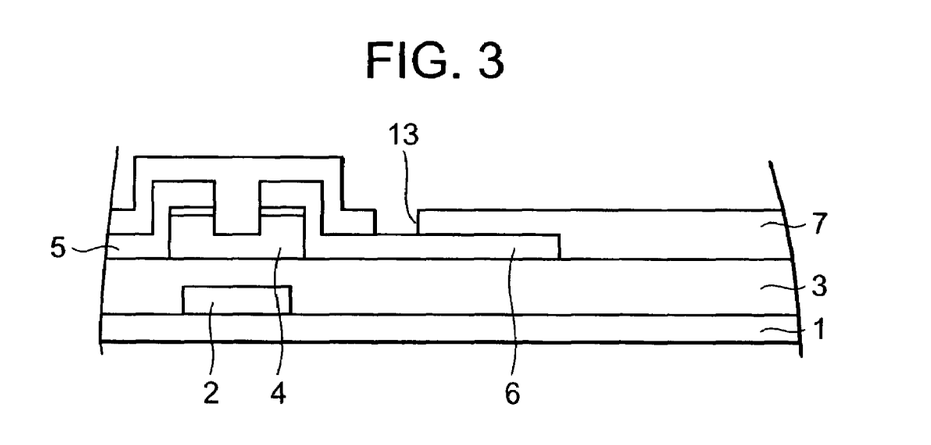
FIG. 3 to FIG. 11 are cross sections showing fabrication steps of a flowchart for fabricating a liquid crystal display according to an embodiment of the present invention.

First, as shown in FIG. 3, after the gate electrode 2, the gate insulating film 3, the semiconductor layer 4 and the source/drain electrodes 5 and 6 are formed on the transparent substrate 1 formed of glass or plastic material and then the passivation film 7 is formed on the whole surface of the wafer, the drain contact hole 13 of the TFT is opened. The gate electrode 2 and the source/drain electrodes 5 and 6 may be formed of chromium and the gate insulating film 3 may be formed of silicon oxide. The semiconductor layer 4 may be formed of amorphous silicon or polysilicon and the passivation film 7 may be formed of silicon nitride.

Figure 4:
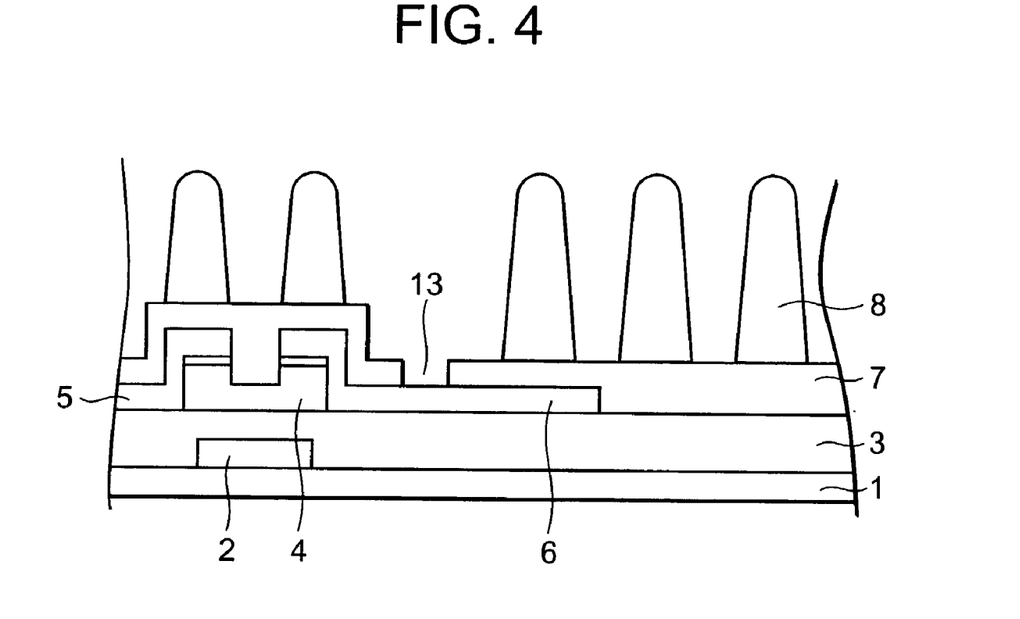

Thereafter, the first transparent organic film of such as a photo sensitive acrylic resist is formed on the whole surface of the wafer by painting, patterned to a desired shape and sintered, resulting in the transparent organic layer 8 having irregular thickness (for example, the whole surface of the wafer is studded with circular pillars) as shown in FIG. 4. Thereafter, the second transparent organic film 9 of such as a photosensitive acrylic resist is formed on the whole surface of the organic film 8 by painting. Thereafter, the drain contact hole 13 is opened and the organic layers 8 and 9 are sintered, resulting in the second transparent organic films 8 and 9 having irregular surface, as shown in FIG. 5.

Figure 5:
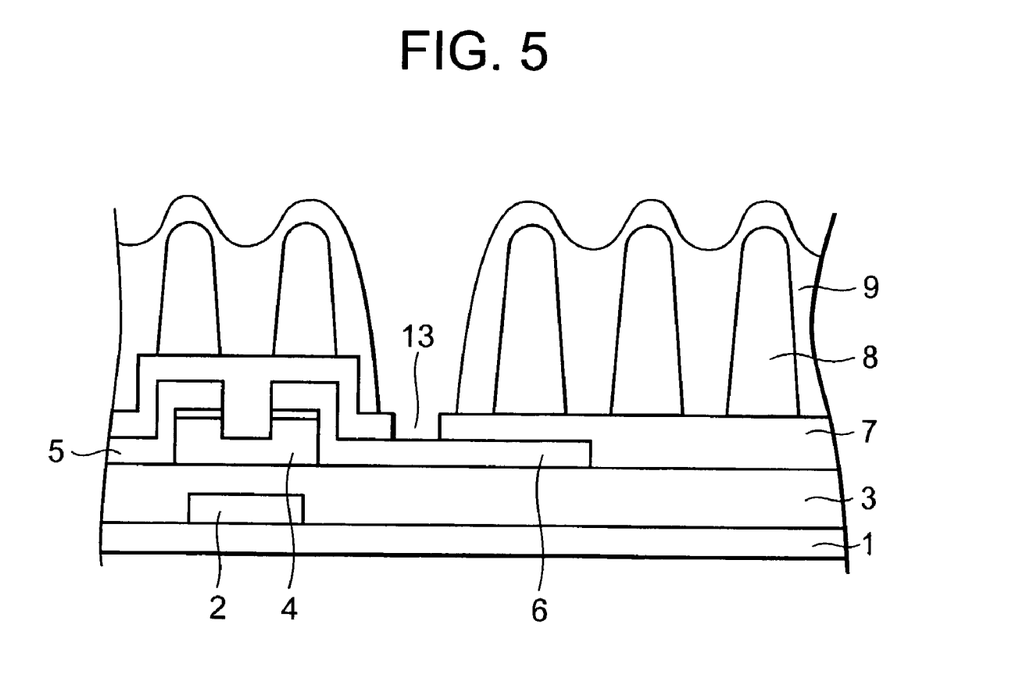

Incidentally, it is preferable in view of easiness of formation of the irregular surface such as shown in FIG. 5 that viscosity of the first organic film 8 is higher than that of the second organic film 9. In the following description, a term "organic film" means the organic films 8 and 9.

Figure 6:
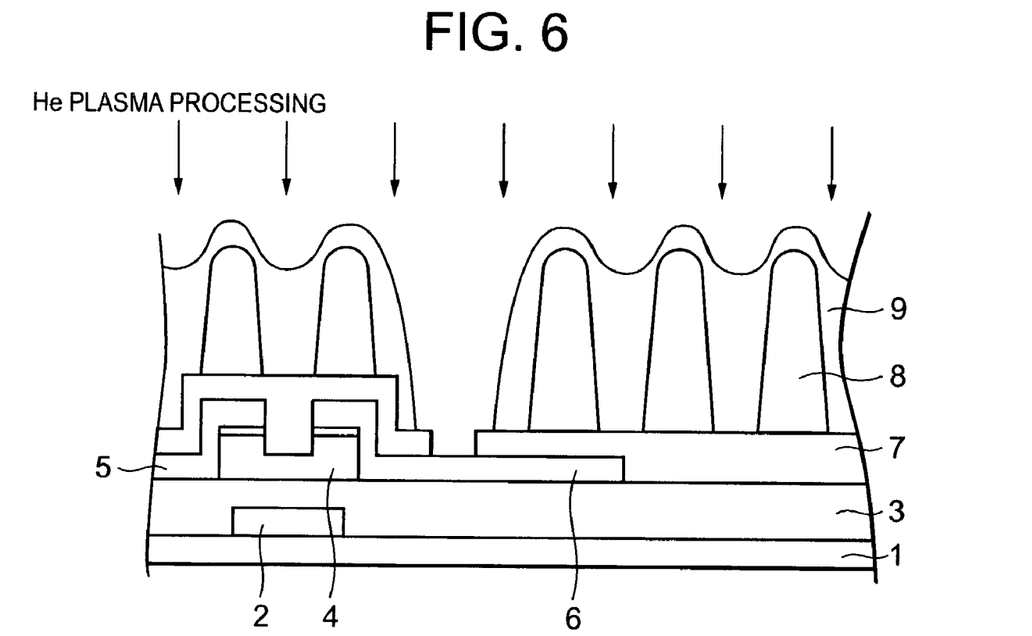

Thereafter, as shown in FIG. 6, the surface of the organic film 9 is put in a plasma-processing under condition of, for example, flow rate of helium (He) gas of 100 sccm, pressure of 20 Pa and power density of 0.9 w/cm$^2$.

Figure 7:
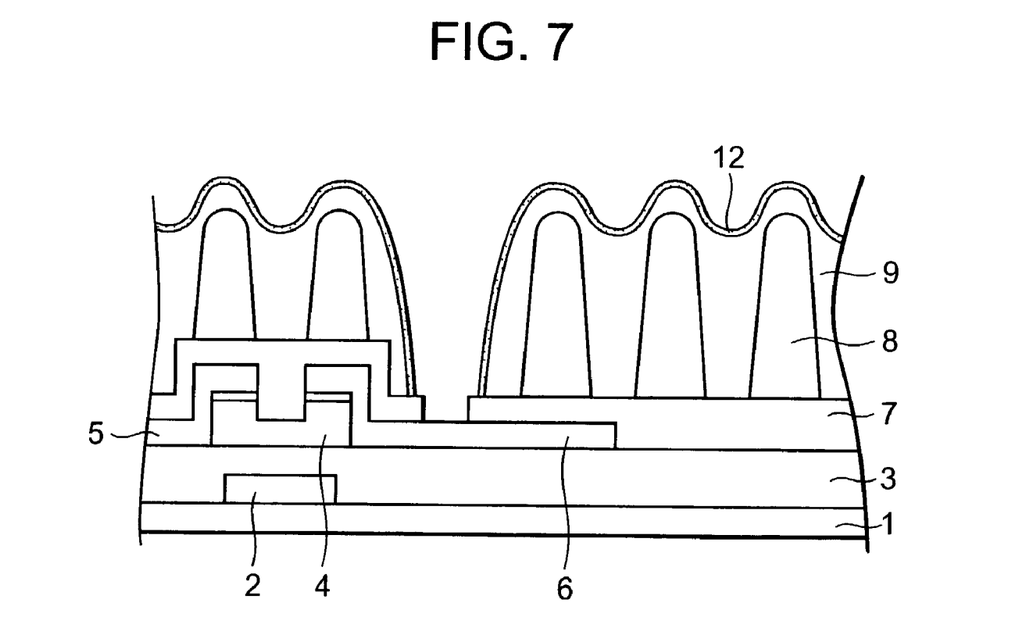

Thereafter, as shown in FIG. 7, the surface of the surface quality-improving layer 12 formed by the plasma-processing is washed by the washing liquid. As the washing liquid, it has been found that either pure water or alkaline liquid (tetramethylammonium hydroxide (TMAH)+surfactant) is effective. Ozone water, functional water or acid may be also usable. In this embodiment, the washing step is included in a flow line in an in-line step and performed by shower of the alkaline washing liquid.

Although a washing device used in the washing step includes a ultra-violet lamp, it has been found that the battery effect can be restricted even without using the ultra-violet lamp. Therefore, it can be said that the additional washing with using the washing liquid improves reproducibility of good product.

Figure 8:
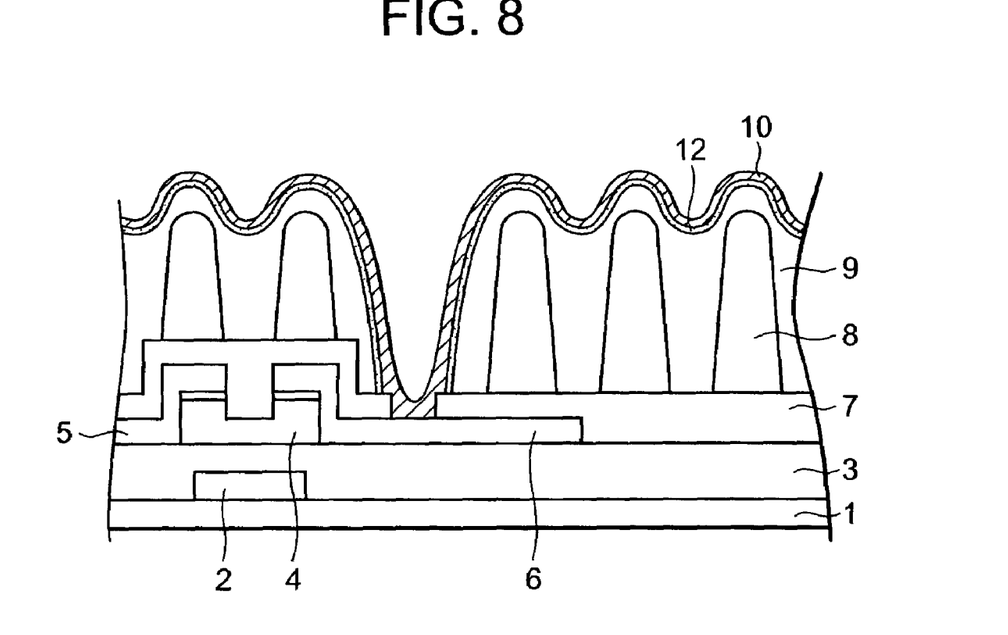
Figure 9:
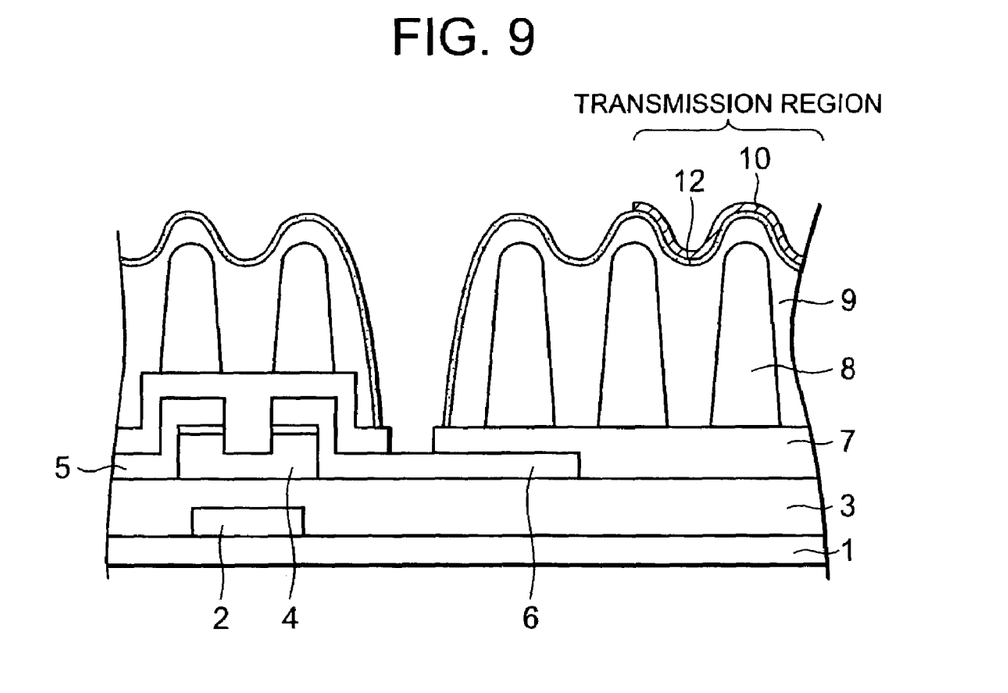

The washed wafer is passed through a drying step and then, as shown in FIG. 8, the ITO film 10 is formed on the whole surface of the wafer by sputtering at room temperature. The ITO film 10 is patterned by using a resist as a mask as shown in FIG. 9 and then the transparent electrode region 10 is formed by anneal sintering. The anneal sintering is effective in reducing resistance of the ITO film when the latter is sputtered at room temperature.

Figure 10:
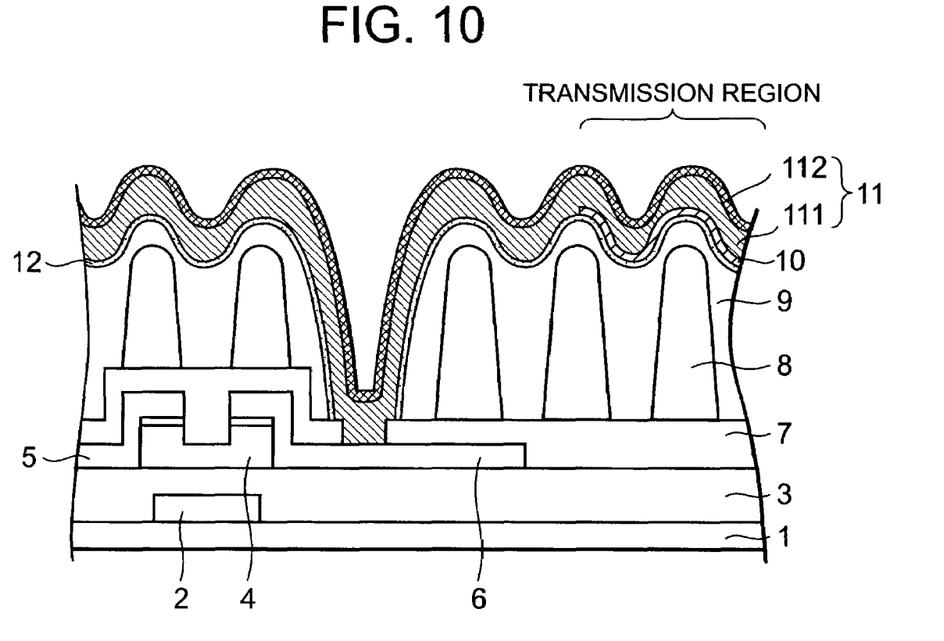
Figure 11:
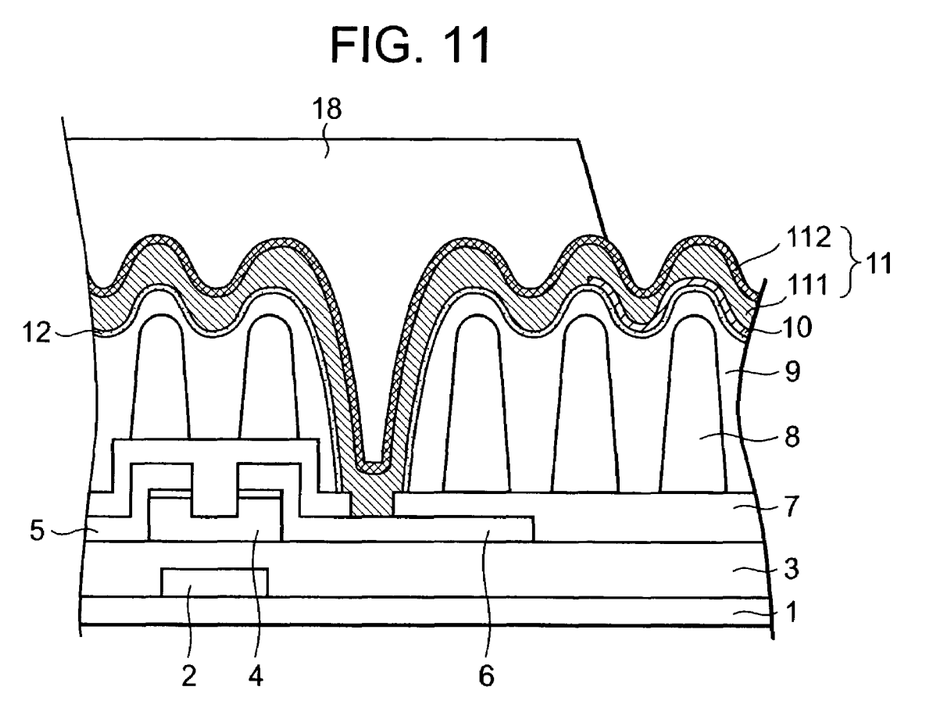

Thereafter, as shown in FIG. 10, a molybdenum film 111 and an aluminum film 112 are formed in the order on the ITO film and on the portion of the surface quality-improving layer, which is exposed in the contact hole 13 to form an aluminum-molybdenum lamination layer 11 of the films 111 and 112. Thereafter, a resist is formed on the whole surface of the aluminum-molybdenum lamination layer 11. The resist is exposed and developed to form a resist pattern 18 for exposing the transparent electrode, as shown in FIG. 11.

Thereafter, the aluminum-molybdenum lamination layer 11 is etched by known method (for example, etching using a mixture of phosphoric acid, nitric acid and acetic acid) with using the resist pattern 18 as a mask, resulting in the electrode structure shown in FIG. 1 and FIG. 2.

In the described embodiment, the ITO film 10 is formed by sputtering at room temperature. However, it has been confirmed that, when the ITO film 10 is formed at 200° C., it is possible to remove the annealing step.

It has been further found that, when helium gas is used in the plasma processing, opimization of processing conditions becomes easier compared with a case where other inert gas such as argon gas is used therefor.

For example, thickness of the lower molybdenum layer 111 of the aluminum-molybdenum lamination layer 11 is 200 nm and that of the upper aluminum layer 112 is 100 nm. Thickness of the ITO film 10 in this embodiment is 50 nm.

The aluminum layer 111 may be formed of an alloy containing aluminum as a main constituent, such as an alloy of aluminum and neodymium (Nd). The transparent electrode may be formed of other material than ITO. For example, indium-zinc oxide can be used therefor.

In the developing step for forming the resist pattern 18, it has been confirmed that no battery effect is found between aluminum and ITO. Although the reason for the preferable effect obtainable when the surface quality improving layer 12 after the plasma processing is washed by the washing liquid is not clear so far, it has been confirmed that good products can be obtained with high reproducibility.

Figure 12:
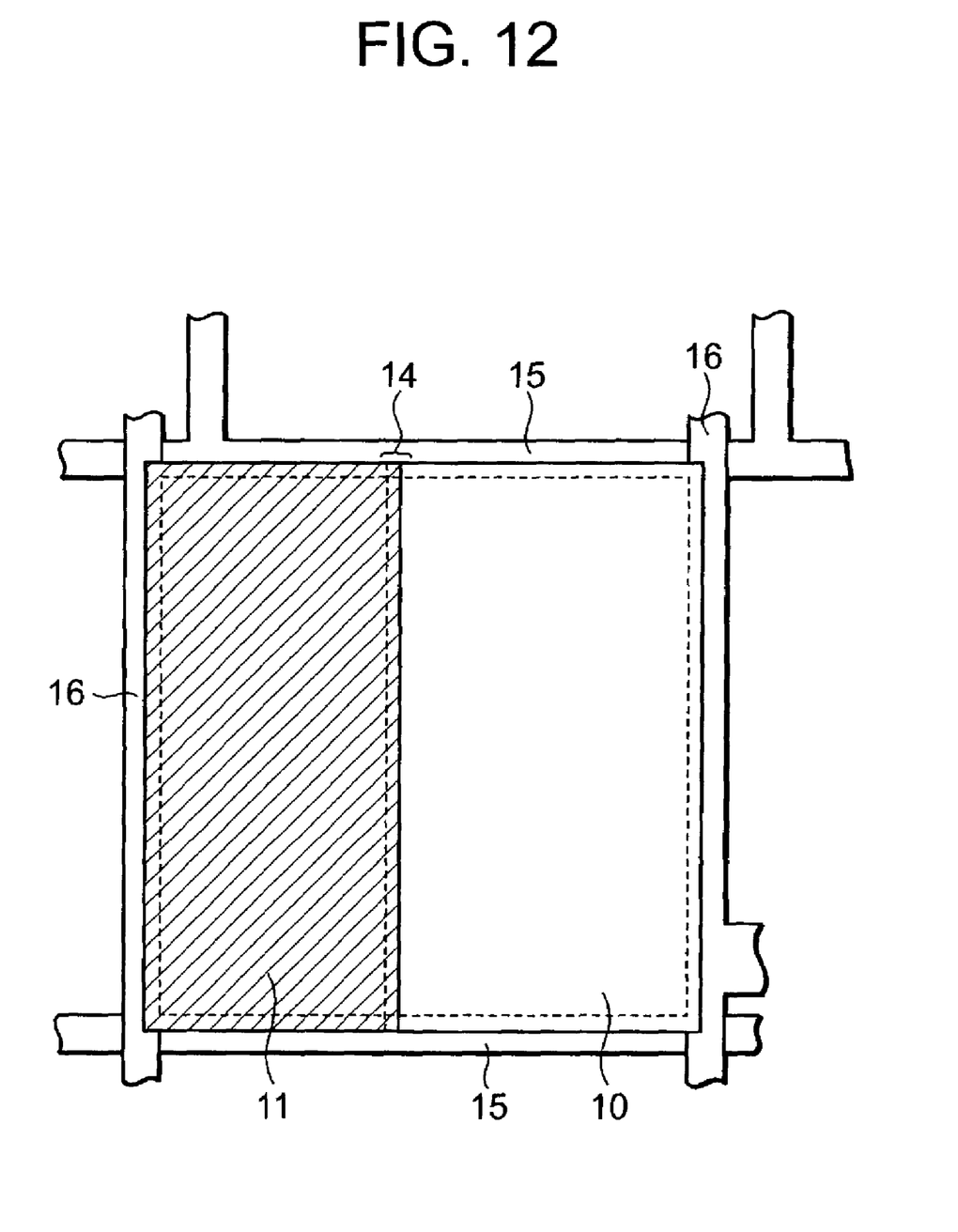
FIG. 12 is a plan view of a TFT substrate of a liquid crystal display according to another embodiment of the present invention.

Although, in the described embodiment, the pixel electrode is divided by a line extending in parallel to the direction of the scan line 15, it is possible to divide the pixel electrode by a line parallel to the data line 16 as shown in FIG. 12.

Figure 13:
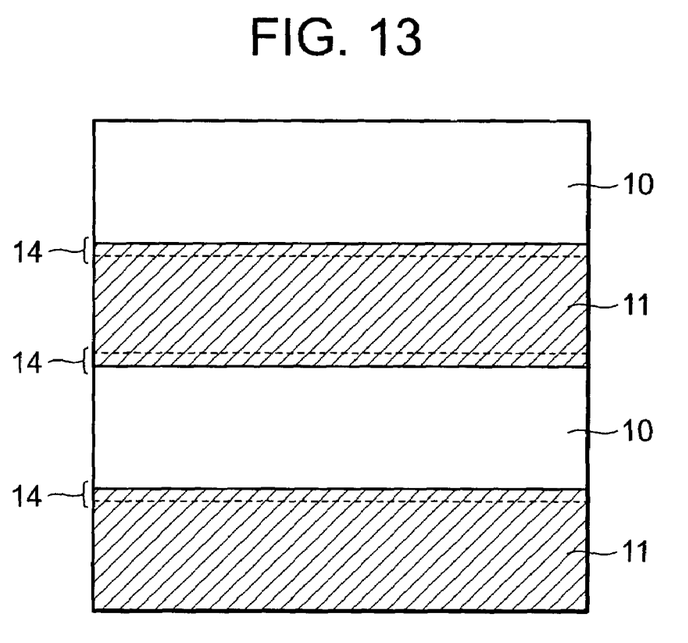
FIG. 13 is a plan view of a TFT substrate of a liquid crystal display according to a further embodiment of the present invention.
Figure 14:
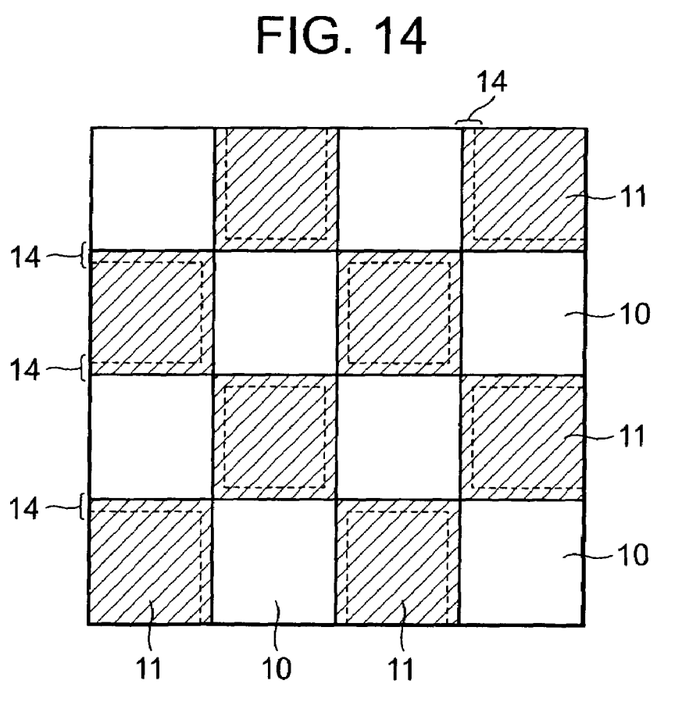
FIG. 14 is a plan view of a TFT substrate of a liquid crystal display according to a still further embodiment of the present invention.

Furthermore, it is possible to divide the pixel electrode to more than 2 areas such that a plurality of transparent electrodes 10 and a plurality of reflection electrodes 11 are arranged alternately as shown in FIG. 13 or such that the transparent electrodes 10 and the reflection electrodes 11 are arranged in a so-called checkered pattern as shown in FIG. 14. Since, in the latter cases, transmission regions are dispersed when a backlight is used, visibility of an image displayed thereby becomes improved.

It is preferable that an area of the transparent electrode or electrodes 10 is substantially equal to or larger than an area of the reflection electrode or electrodes 11 as shown in FIG. 13. This is because there is a requirement that a user in the fields sees an image displayed in order to simply obtain an information without requiring clearness of the image and uses a backlight in the interior of a room in order to see a clear image.

As mentioned hereinbefore, it is possible to restrict the battery effect in the developing step of the resist used as the aluminum patterning mask to thereby improve the reproducibility of good products by providing the molybdenum film between the ITO film and the aluminum film, which are formed on the organic film, forming the surface quality improving layer in the surface of the organic film prior to the formation of the ITO film and washing the surface improving layer with using washing liquid. Although the reason for the restricting effect of battery effect is not clear so far, it shall be made clear in the future.

By washing the surface of the organic film by not only the plasma processing but also the washing liquid, the battery effect between aluminum and ITO in the resist-developing step can be effectively restricted. Therefore, it becomes possible to use the conventional fabrication method of the reflection type liquid crystal display without requiring any substantial modification to thereby substantially reduce the developing cost of the new method.

What is claimed is:

1. A method for fabricating a semi-transmission liquid crystal display, comprising:
    forming a thin film transistor on a transparent substrate;
    forming an organic film on said substrate;
    forming a surface improving layer on a surface of said organic film by plasma processing of said organic film;
    washing a surface of said surface improving layer using a washing liquid, said washing liquid comprising an alkaline liquid;
    forming a transparent electrode film on said surface of said surface improving layer washed by the washing liquid;
    exposing said improving layer through said transparent electrode film by patterning said transparent electrode film to a desired pattern;
    forming a reflection electrode film on said surface of said patterned transparent electrode film and said surface of said improving layer exposed through said transparent electrode;
    forming a resist mask for forming an opening portion for exposing said transparent electrode film through said reflection electrode film, said forming said resist mask comprising:
        forming a resist film on a whole surface of said reflection electrode film;
        exposing said resist film; and
        developing said resist film;
    patterning said reflection electrode film by using said resist mask such that said transparent electrode film is exposed trough said opening portion of said reflection electrode film; and
    removing said resist mask.

2. A method for fabricating a semi-transmission liquid crystal display, as claimed in claim 1, wherein said plasma processing is performed by using helium gas.

3. A method for fabricating a semi-transmission liquid crystal display, as claimed in claim 1, wherein said reflection electrode comprises a double layer structure including a lower layer comprising at least one of molybdenum and an alloy of molybdenum and an upper layer comprising at least one of aluminum and alloy of aluminum.

4. A method for fabricating a semi-transmission liquid crystal display, as claimed in claim 1, wherein said transparent electrode film comprises indium tin oxide formed at 200° C.

5. A method for fabricating a semi-transmission liquid crystal display, as claimed in claim 1, wherein said forming said transparent electrode film is performed immediately after said washing said surface of said surface improving layer.

6. A method for fabricating a semi-transmission liquid crystal display, as claimed in claim 1, wherein said transparent electrode film is formed directly on said surface improving layer.

7. A method for fabricating a semi-transmission liquid crystal display, as claimed in claim 1, wherein said washing said surface of said improving layer is performed in-line using a shower of said washing liquid.

8. A method for fabricating a semi-transmission liquid crystal display, as claimed in claim 1, wherein said surface improving layer improves an adhesion between said organic film and said transparent electrode film.

9. A method for fabricating a semi-transmission liquid crystal display, as claimed in claim 1, wherein said reflection electrode comprises an aluminum film and a layer formed between said aluminum film and said transparent electrode, said layer inhibiting a reaction between said aluminum film and said transparent electrode.

10. A method for fabricating a semi-transmission liquid crystal display, as claimed in claim 1, wherein said reflection electrode comprises two layers, and said patterning said reflection electrode film comprises using a same etching liquid to etch said two layers.

11. A semi-transmission liquid crystal display fabricated by a method for fabricating a semi-transmission liquid crystal display, said method comprising:

forming a thin film transistor on a transparent substrate;
  forming an organic film on said substrate;
  forming a surface improving layer on a surface of said organic film by plasma processing of said organic film;
  washing a surface of said surface improving layer using a washing liquid;
  forming a transparent electrode film on said surface of said surface improving layer washed by the washing liquid;
  exposing said improving layer through said transparent electrode film by patterning said transparent electrode film to a desired pattern;
  forming a reflection electrode film on said surface of said patterned transparent electrode film and said surface of said improving layer exposed through said transparent electrode;
  forming a resist mask for forming an opening portion for exposing said transparent electrode film through said reflection electrode film, said forming said resist mask comprising:
    forming a resist film on a whale surface of said reflection electrode film;
    exposing said resist film; and
    developing said resist film;
  patterning said reflection electrode film by using said resist mask such that said transparent electrode film is exposed through said opening portion of said reflection electrode film; and
  removing said resist mask,
    wherein said display comprises:
      a pixel electrode in a region defined by adjacent two scan lines and adjacent two data lines, said pixel electrode being divided into a transparent electrode region and a reflection electrode region both of which are fanned on said washed improving layer of said organic film, and
    wherein said pixel electrode is divided by lines extending in parallel to said data line and lines extending in parallel to said scan line to form a plurality of transparent electrode regions and reflection electrode regions arranged in a checkered pattern.

12. A semi-transmission liquid crystal display as claimed in claim 11, wherein an area of said transparent electrode region is substantially equal to an area of said reflection electrode region.

13. A semi-transmission liquid crystal display as claimed in claim 11, wherein an area of said transparent electrode region is larger than an area of said reflection electrode region.

14. A method for fabricating a semi-transmission liquid crystal display, as claimed in claim 11, wherein said washing liquid comprises one of pure water, ozone water, functional water and an acid.

* * * * *